United States Patent
Natzke

(10) Patent No.: US 9,990,740 B2
(45) Date of Patent: Jun. 5, 2018

(54) CAMERA-BASED BRUSH CREATION

(71) Applicant: Adobe Systems Incorporated, San Jose, CA (US)

(72) Inventor: Erik Jon Natzke, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 16 days.

(21) Appl. No.: 14/638,958

(22) Filed: Mar. 4, 2015

(65) Prior Publication Data
US 2016/0260229 A1 Sep. 8, 2016

(51) Int. Cl.
*G06T 11/00* (2006.01)

(52) U.S. Cl.
CPC .................. *G06T 11/001* (2013.01)

(58) Field of Classification Search
None
See application file for complete search history.

(56) References Cited

U.S. PATENT DOCUMENTS 6,201,549 B1* 3/2001 Bronskill .............. G06T 11/001 345/441
6,310,622 B1* 10/2001 Asente .................... G06T 11/00 345/440

OTHER PUBLICATIONS

Kartik, "camera launch on button click in android," Sep. 19, 2013, https://web.archive.org/web/20130919165809/http://stackoverflow.com/questions/5788413/camera-launch-on-button-click-in-android.*
Burn Barrel Media, "How to Make a Brush From a Photo in Photoshop," Sep. 19, 2012, https://www.youtube.com/watch?v=ED7d3fu1qls.*
GIMP, "3.5 Palettes Dialog," Dec. 11, 2011, https://web.archive.org/web/20111225172112/http://docs.gimp.org/en/gimp-palette-dialog.html.*
Photoshop Help, "Creating and Modifying Brushes," http://helpx.adobe.com/photoshop/using/creating-modifying-brushes.html, Mar. 7, 2013.*
DrawPlus, "Creating Brushes", http://www.serif.com/appresources/DPX4/Tutorials/en-us/DrawPlus/Creating_Brushes.htm, Feb. 19, 2012.*
GIMP, "3.2. Dynamics", http://docs.gimp.org/en/gimp-tool-dynamics.html, 2011.*
RobinWoodEnt, "Brushes 2—Shape Dynamics," https://www.youtube.com/watch?v=iHr0UpNEw-8, 2010.*

* cited by examiner

*Primary Examiner* — Nicholas R Wilson
(74) *Attorney, Agent, or Firm* — Wolfe-SBMC

(57) ABSTRACT

In embodiments of camera-based brush creation, an image is displayed in a brush application interface of a virtual brush application on a computing device. A photo capture selection can be received through the brush application interface to initiate capturing a digital photo of the image with a camera device of the computing device. A brush can then be created for the virtual brush application based on the image and brush-edit inputs, and the brush saved as a brush template in a brush library that is accessible by the virtual brush application. The brush can be created as a ribbon brush that expands a middle section of the image represented as a brush stroke in the brush application interface. Alternatively, the brush can be created as a scatter brush that repeats multiple images of the image represented as a brush stroke in the brush application interface.

20 Claims, 15 Drawing Sheets

CAMERA-BASED BRUSH CREATION

BACKGROUND

Many device users have portable electronic and computing devices, such as mobile phones, tablet computers, multimedia devices, and similar mobile devices. These types of mobile devices are increasingly designed with more memory and processing capabilities, and generally include a camera device that can be utilized to capture digital images. With the increased memory and processing capabilities, these types of mobile devices can also be used to run imaging applications, such as may be used for image processing and/or sketch creation. However, as with most computer-generated images, it can be very difficult to generate an image that has both the look and "feel" of a natural appearing image. Typically, the processing algorithms that are used have a tendency to create images that appear digitally created, and have a detectable, unnatural appearance or characteristic. This is also common with conventional imaging applications that have a feature to create a virtual brush from vectors and bitmaps that have been preprocessed and converted to black and white.

SUMMARY

This Summary introduces features and concepts of camera-based brush creation, which is further described below in the Detailed Description and/or shown in the Figures. This Summary should not be considered to describe essential features of the claimed subject matter, nor used to determine or limit the scope of the claimed subject matter.

Camera-based brush creation is described. In embodiments, an image is displayed in a brush application interface of a virtual brush application on a computing device. A photo capture selection can be received through the brush application interface to initiate capturing a digital photo of the image with a camera device of the computing device. A brush can then be created for the virtual brush application based on the image and brush-edit inputs, and the brush saved as a brush template in a brush library that is accessible by the virtual brush application and other imaging applications. The brush can be created as a scatter brush that repeats multiple images (e.g., "stamps") of the image represented as a brush stroke in the brush application interface. Alternatively, the brush can be created as a ribbon brush that expands a middle section of the image represented as a brush stroke in the brush application interface. A ribbon brush includes selectable sections of the brush, such as a head section, a body section, and a tail section of the image, and the body section expands as a brush stroke while the head and tail sections are maintained as ends of the brush stroke in the brush application interface.

In implementations, the brush can be created for the virtual brush application by altering the image based on the brush-edit inputs to refine and review the brush before saving the brush as the brush template. For example, the image may be of a texture and the brush is created based on the texture and the brush-edit inputs. Alternatively or in addition, the image may be stretched to create a color palette based on color of the image, where the image is generally obfuscated by the stretching of the image.

While a brush is being created in the brush application interface, the image can be canceled as the basis from which the brush is created, and another photo capture selection received through the brush application interface to capture another digital photo as a different version of the image. The brush can then be created for the virtual brush application based on the different version of the image and additional brush-edit inputs, and saved as the brush template in the brush library. Further, the brush template can be accessed from the brush library, the brush updated to create a revised brush template, and the updated brush saved as the revised brush template back in the brush library.

BRIEF DESCRIPTION OF THE DRAWINGS

Embodiments of camera-based brush creation are described with reference to the following Figures. The same numbers may be used throughout to reference like features and components that are shown in the Figures.

DETAILED DESCRIPTION

Embodiments of camera-based brush creation are described, and the techniques enable a user of a mobile device, such as a mobile phone or tablet device, to capture a digital photo and create a virtual brush that can then utilized in sketching, drawing, and other imaging applications. A browser application interface of a virtual brush application includes a camera mode through which a user can capture a digital photo as the source to create a new brush. The browser application interface then transitions to a brush editing mode where the user can initiate various brush-edit inputs to refine and alter properties of the brush, and review the brush before saving the brush as a brush template. If the user becomes dissatisfied with the source image, the user can cancel the brush edit mode and start again, while still in the presence of whatever image source (e.g., the texture, color, composition, etc.) inspired the user.

The techniques of camera-based brush creation allow a user to have more impact on the kind of art work created, in the sense that a virtual brush created from the environment will appear natural, with the look and "feel" of natural textures and colors that are preserved from a source image. For example, a charcoal stick can be used to draw on paper, the charcoal image photographed, and then the texture and characteristics of the charcoal image used to create a brush that performs as a natural media in digital form, taking on the characteristics of drawing with charcoal. Rather than looking at a sketch or other art work that has the appearance of computer-generated imagery due to the characteristics of a particular imaging application, the art work created using virtual brushes that have been created from natural environment images will have more creative identity and input from the user artist. This allows the aesthetic output of an art work to match the aesthetic of the individual artist, rather than the algorithmic appearance of the computer application used to generate the art work.

While features and concepts of camera-based brush creation can be implemented in any number of different devices, systems, networks, environments, and/or configurations, embodiments of camera-based brush creation are described in the context of the following example devices, systems, and methods.

Figure 1:
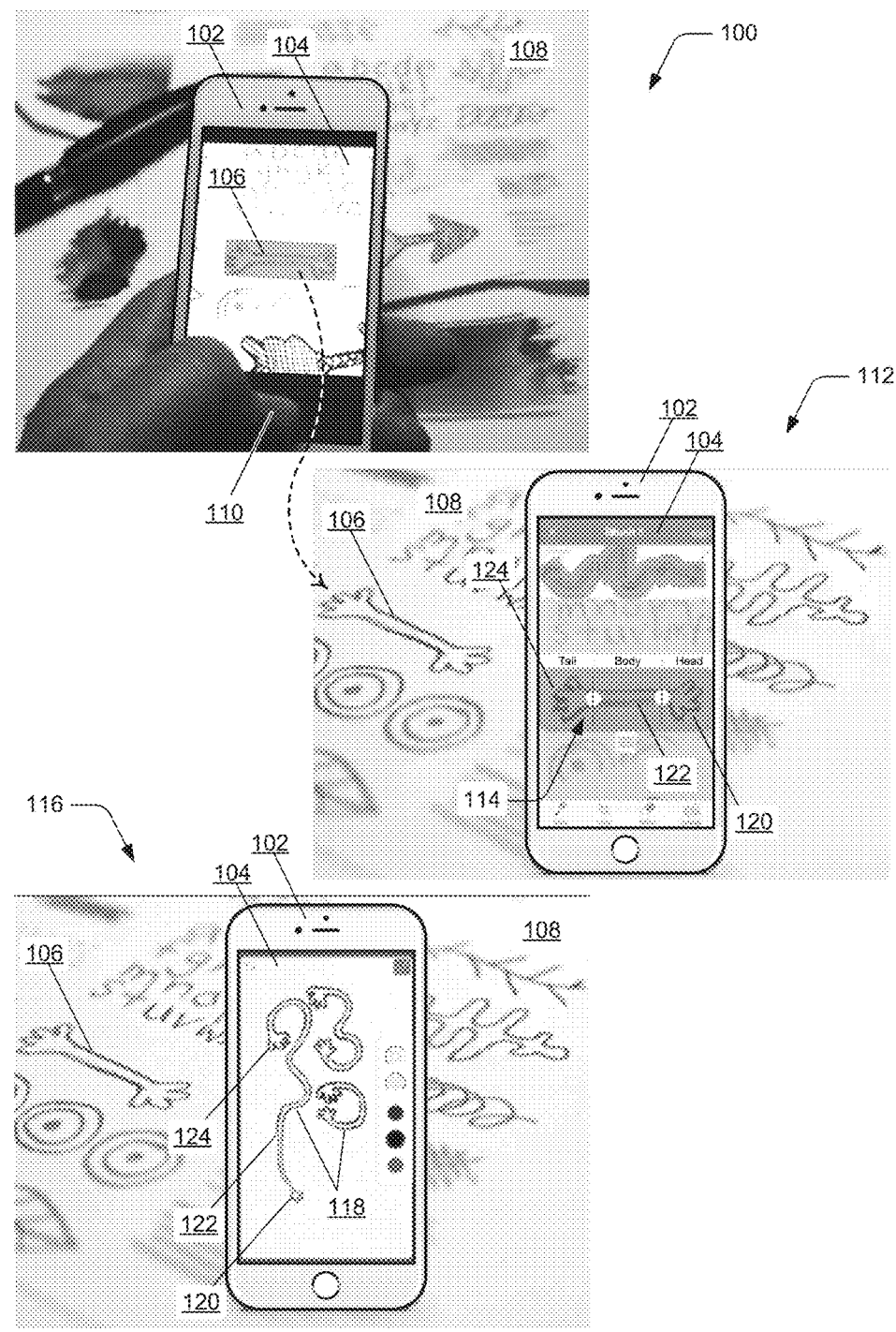
FIG. 1 illustrates an example of a mobile device used to implement embodiments of camera-based brush creation as described herein.

FIG. 1 illustrates an example 100 of a mobile device, such as the mobile phone 102 shown in this example or a tablet device, in which embodiments of camera-based brush creation can be implemented. As detailed in the system description shown in FIG. 6, the mobile phone 102 can display a brush application interface 104 of a virtual brush application. An image 106 of the environment 108 can be displayed in the brush application interface 104 of the virtual brush application on the mobile device. In this example 100, the user can position the mobile phone 102 over a sketch page of hand-drawn images (e.g., the environment 108). The user can then initiate a photo capture selection 110 through the brush application interface 104 to capture a digital photo of the image 106 with a camera device of the mobile phone 102.

As shown at 112, a brush 114 can then be created for the virtual brush application based on the image 106 and brush-edit inputs, and the brush 114 saved as a brush template in a brush library that is accessible by the virtual brush application. The brush can be created for the virtual brush application by altering the image based on the brush-edit inputs to refine and review the brush before saving the brush as the brush template. For example, the image 106 may be of a texture and the brush 114 is created based on the texture and the brush-edit inputs. Alternatively or in addition, the image 106 may be stretched to create a color palette based on color of the image, where the image is generally obfuscated by the stretching of the image. Examples of a brush created based on texture and/or as a color palette is further shown and described with reference to at least FIGS. 3-5.

Figure 2:
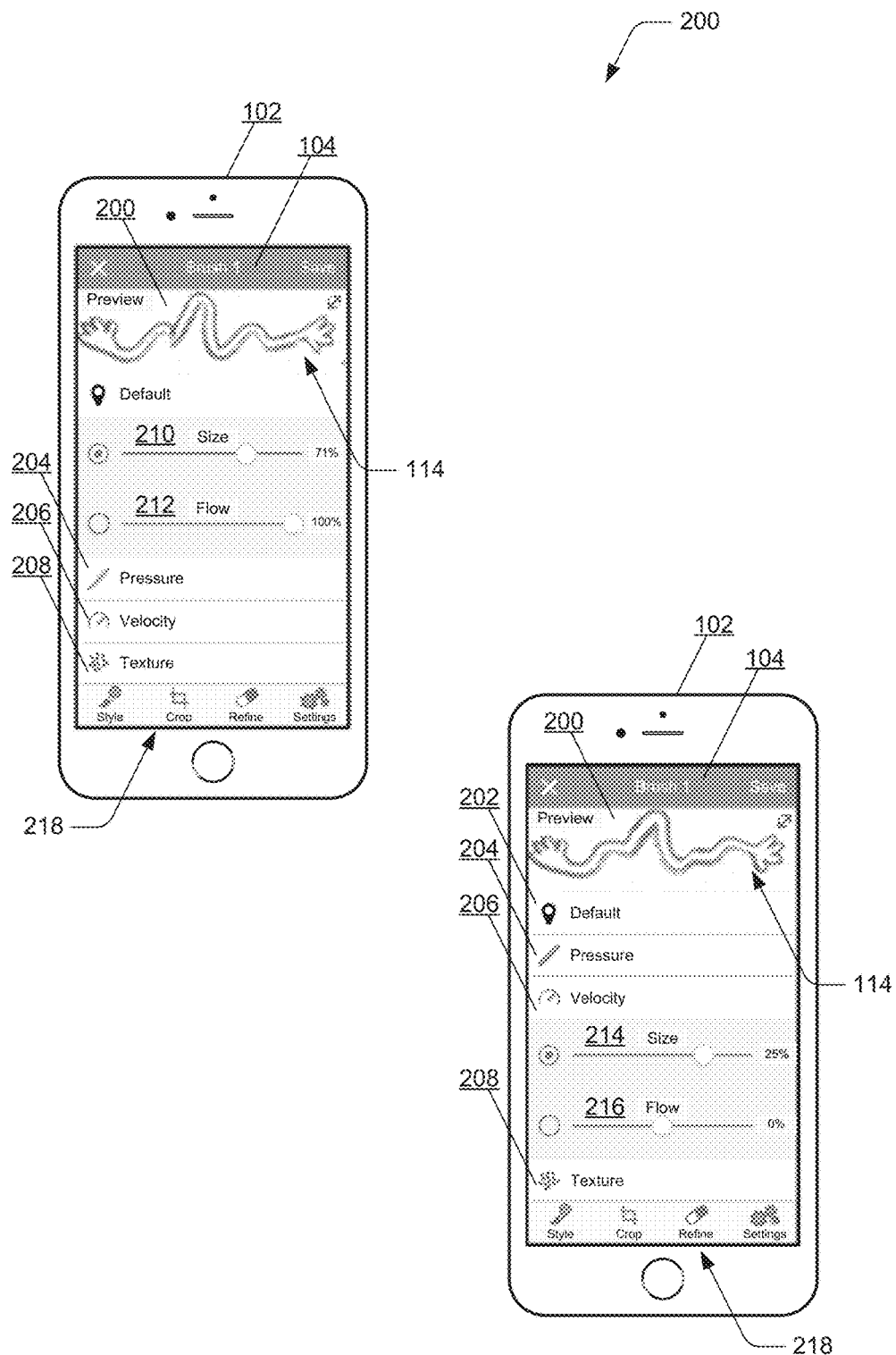
FIG. 2 illustrates examples of brush-edit inputs that can be applied to create a brush from a captured digital image in accordance with one or more embodiments of camera-based brush creation.

FIG. 2 illustrates various examples 200 of the brush-edit inputs that can be applied by a user of the mobile phone 102 (e.g., a mobile device) in the brush application interface 104 to create the brush 114 from the image 106. The brush 114 is displayed in a preview section 202 of the brush application interface 104, and the preview of the brush changes with the brush-edit inputs. In this example, the brush application interface 104 includes selectable brush-edit controls, such as a default control 204, a pressure control 206, a velocity control 208, and a texture control 210. These selectable brush-edit controls also include a subset of slider controls. For example, a user can select the default control 204 to then display a default size control 212 and a default flow control 214 associated with the default control. Similarly, the user can select the velocity control 208 to then display a velocity size control 216 and a velocity flow control 218. In this example, the brush application interface 104 also includes additional brush-edit controls 220 displayed in a tool bar of the brush application interface 104, such as a style, crop, refine, and settings controls that a user can select to edit the brush 114 before being saved as a brush template in the brush library.

Returning to the discussion FIG. 1, the brush 114 can be created as a scatter brush that repeats multiple images (e.g., "stamps") of the image 106 represented as a brush stroke in the brush application interface 104. An example of a brush that is created as scatter brush is further shown and described with reference to FIG. 9. Alternatively, as shown at 116, the brush 114 can be created as a ribbon brush 118 that expands a middle section of the image represented as a brush stroke in the brush application interface 104. The ribbon brush 118 includes selectable sections of the brush, such as a head section 120, a body section 122, and a tail section 124 of the image 106, and the body section 122 expands as a brush stroke while the head and tail sections are maintained as ends of the brush stroke in the brush application interface. The brush-edit inputs include selectable sliders to set the head section 120, the body section 122, and the tail section 124 of the image 106, as shown at 112 in the brush application interface 104. An example of a brush stroke created as the ribbon brush 118 is shown at 116 in the brush application interface 104. Further, an example of a brush that is created as a ribbon brush is shown and described with reference to FIG. 8.

Figure 3:
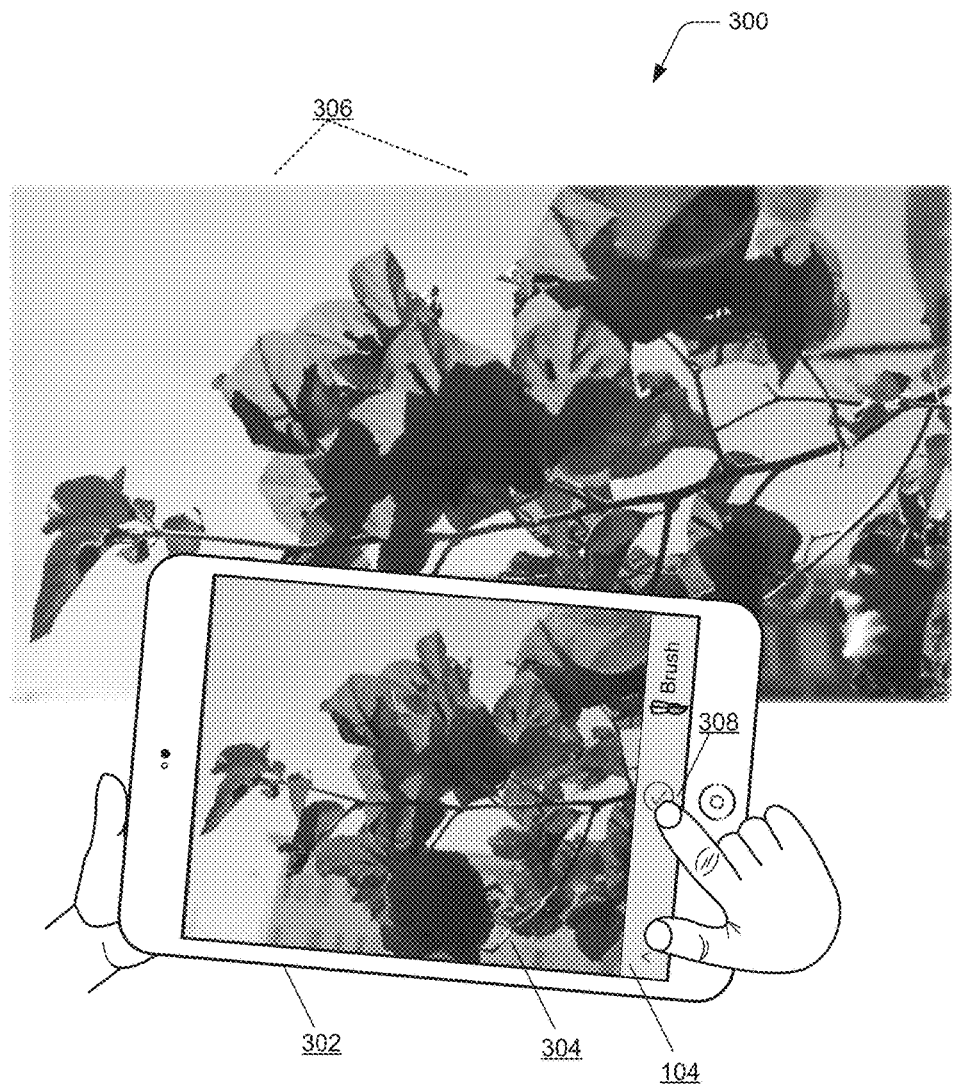
FIG. 3 illustrates another example of a mobile device used to implement embodiments of camera-based brush creation as described herein.

FIG. 3 illustrates another example 300 of a mobile device, such as the tablet device 302, in which embodiments of camera-based brush creation can be implemented. As detailed in the system description shown in FIG. 6, the tablet device 302 can display the brush application interface 104 of the virtual brush application. An image 304 of the environment 306 can be displayed in the brush application interface 104 of the virtual brush application on the mobile device. In this example, the user can initiate a photo capture selection 308 through the brush application interface 104 to capture a digital photo of the image 304 (e.g., a tree branch and leaves) with a camera device of the tablet device 302.

Figure 4:
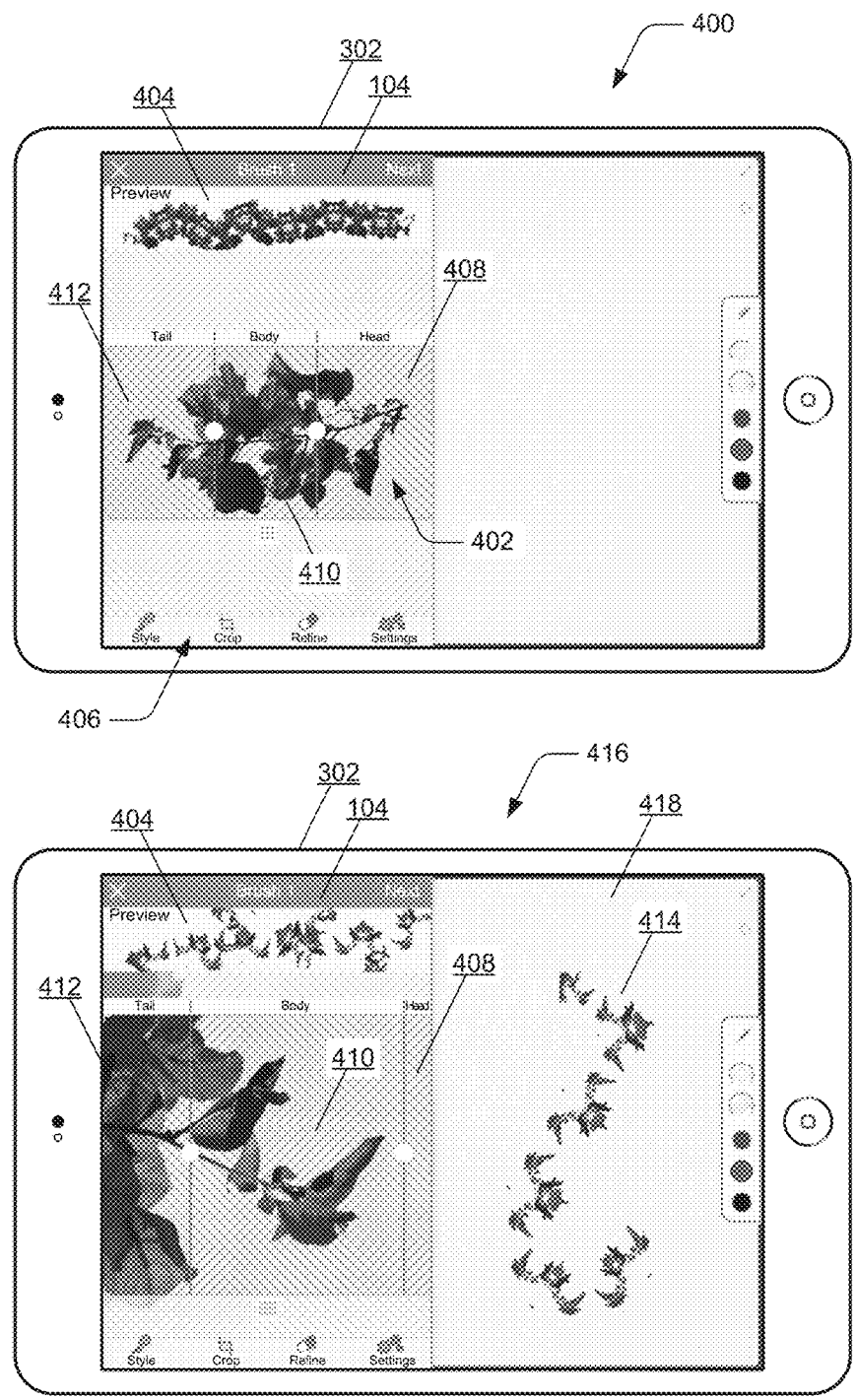
FIG. 4 illustrates an example of a brush that can be created based on a captured digital image in accordance with one or more embodiments of camera-based brush creation.

FIG. 4 illustrates an example 400 of a brush 402 that can be created for the virtual brush application based on the image 304 and brush-edit inputs, and the brush 402 can then be saved as a brush template in a brush library that is accessible by the virtual brush application. The brush 402 can be created for the virtual brush application by altering the image 304 based on the brush-edit inputs to refine and review the brush before saving the brush as the brush template. The brush 402 is displayed in a preview section 404 of the brush application interface 104, and the preview of the brush changes with the brush-edit inputs. In this example, the brush application interface 104 includes various brush-edit controls 406, such as the style, crop, refine, and settings controls that a user can select to edit the brush 402 before being saved as a brush template in the brush library.

Additionally, the brush 402 can be created as a ribbon brush that expands a middle section of the image represented as a brush stroke in the brush application interface 104. The ribbon brush includes selectable sections of the brush, such as a head section 408, a body section 410, and a tail section 412 of the image 304, and the body section 410 expands as a brush stroke while the head and tail sections are maintained as ends of the brush stroke in the brush application interface. The brush-edit inputs include the selectable sliders to set the head section 408, the body section 410, and the tail section 412 of the image 304 in the brush application interface 104. Another example of a ribbon brush 414 is shown as a brush stroke at 416 in a creative space 418 of the brush application interface 104 based on a revised head section 408, body section 410, and tail section 412 of the image 304.

Figure 5:
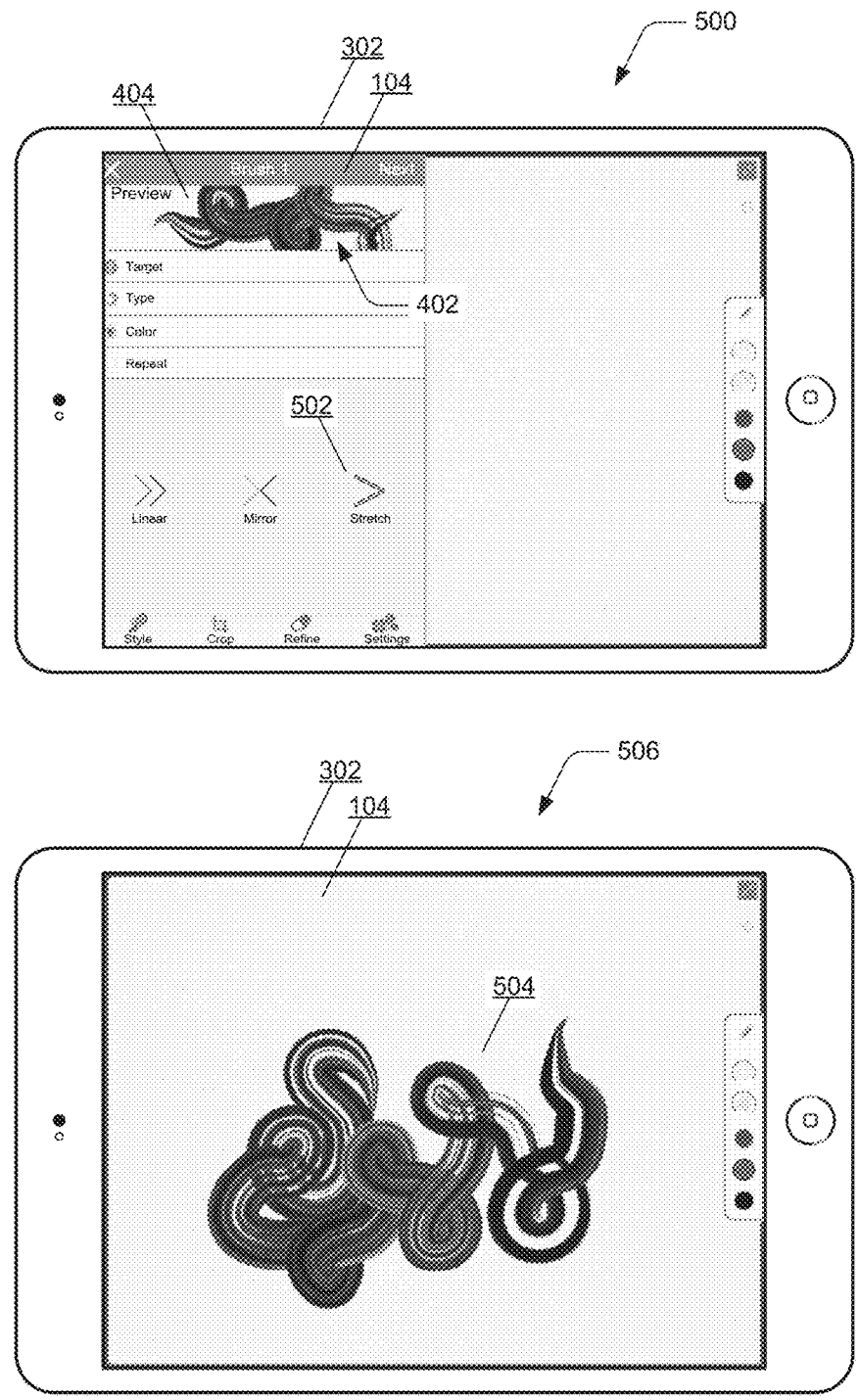
FIG. 5 further illustrates the example brush and brush-edit inputs that can be applied to create the brush from the image in accordance with one or more embodiments of camera-based brush creation.

FIG. 5 illustrates another example 500 of the brush 402 as displayed in the preview section 404 of the brush application interface 104 on the tablet device 302. In this example, the image is stretched based on a brush-edit input to stretch 502 the image 304 and create a color palette based on color of the image, where the image is generally obfuscated by the stretching. Example brush strokes 504 of the stretched image are shown at 506 in the brush application interface 104.

Figure 6:
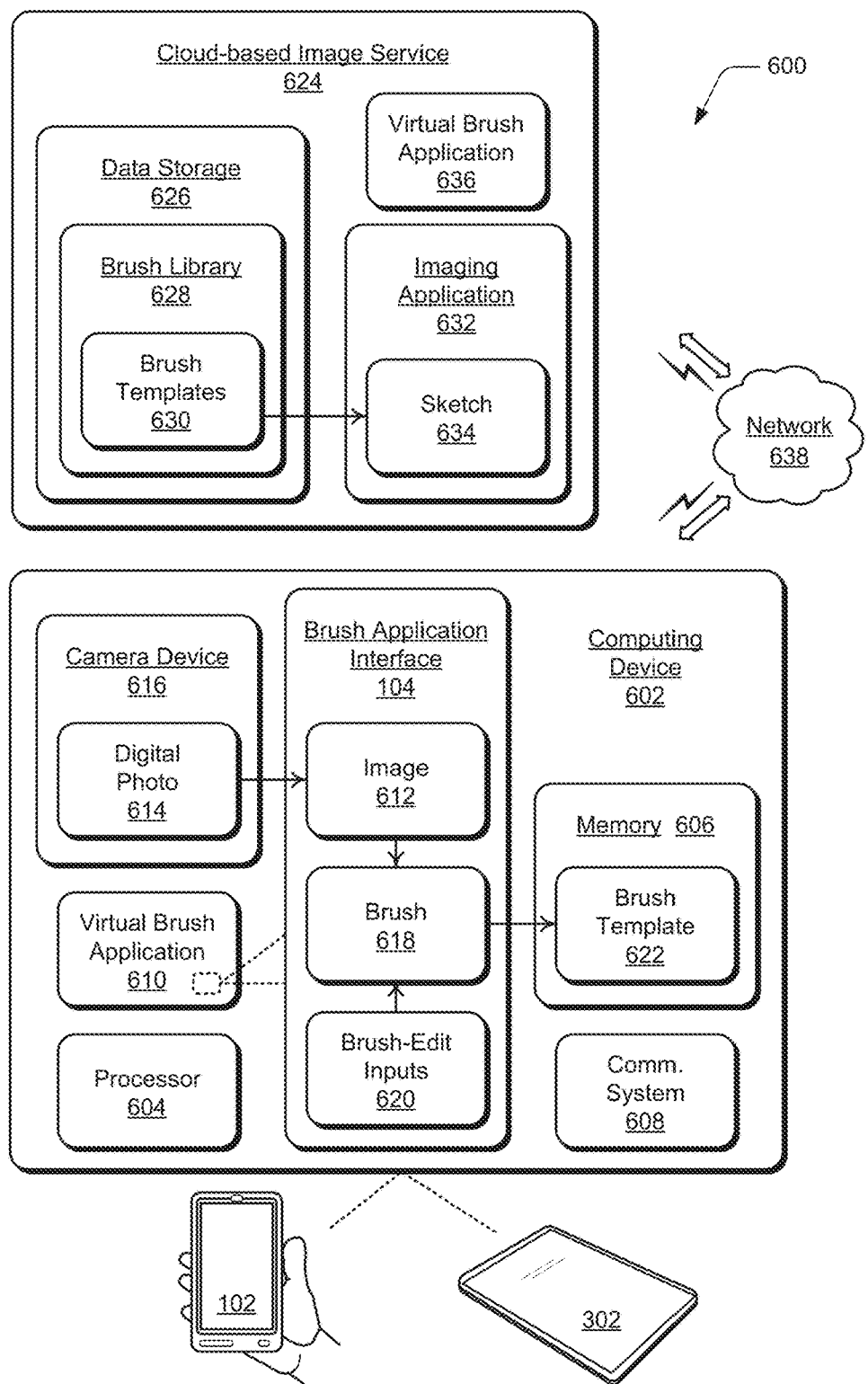
FIG. 6 illustrates an example system in which embodiments of camera-based brush creation can be implemented.

FIG. 6 illustrates an example system 600 in which embodiments of camera-based brush creation can be implemented. The example system 600 includes a computing device 602, such as the mobile phone 102 shown in FIGS. 1 and 2, the tablet device 302 shown in FIGS. 3-5, and/or any other type of a media playback, computing, communication, gaming, entertainment, or portable electronic media device. The computing device 602 can be implemented with various components, such as a processor 604 (or processing system) and memory 606, and with any number and combination of differing components as further described with reference to the example device shown in FIG. 12. Although not shown, the computing device 602 can include a power source, such as a battery, to power the various device components. Further, the computing device 602 can include different wireless radio systems, such as for Wi-Fi, Bluetooth™, Mobile Broadband, LTE, or any other wireless communication system or format. Generally, the computing device 602 implements a communication system 608 that includes a radio device, antenna, and chipset that is implemented for wireless communication with other devices, networks, and services.

The computing device 102 includes the brush application interface 104 of a virtual brush application 610, as referred to and described herein. The virtual brush application 610 can be implemented as a software application or module, such as executable software instructions (e.g., computer-executable instructions) that are executable with the processor 604 (or with a processing system) to implement embodiments of camera-based brush creation. The virtual brush application 610 can be stored on computer-readable storage memory (e.g., the device memory 606), such as any suitable memory device or electronic data storage implemented in the computing device.

In implementations, an image 612 is displayed in the brush application interface 104 of the virtual brush application 610 on the computing device 602. A photo capture selection can then be received through the brush application interface 104 to initiate capturing a digital photo 614 of the image 612 with a camera device 616 of the computing device. As shown in FIG. 1 for example, the image 106 of the environment 108 is displayed in the brush application interface 104, and the user can position the mobile phone 102 over the sketch page of the hand-drawn images and capture a digital photo of the image 106 through the brush application interface 104 with the camera device of the mobile phone 102. Similarly as shown in FIG. 3, the image 304 of the environment 306 is displayed in the brush application interface 104, and the user can capture the digital photo of the image 304 through the brush application interface 104 with the camera device of the tablet device 302.

In embodiments, a brush 618 can then be created for the virtual brush application 610 based on the image 612 and the brush-edit inputs 620, and the brush 618 can be saved as a brush template 622. As described with reference to the previous FIGS. 1-5, the brush 618 can be created for the virtual brush application 610 by altering the image based on the brush-edit inputs 620 to refine and review the brush before saving the brush as the brush template 622. Further, the brush 618 can be created as a scatter brush that repeats multiple images of the image 612 represented as a brush stroke in the brush application interface 104, or created as a ribbon brush that expands a middle section of the image 612 represented as a brush stroke in the brush application interface.

While the brush 618 is being created in the brush application interface 104 based on the image 612 and the brush-edit inputs 620, the image can be canceled as the basis from which the brush is created, and another digital photo 614 captured through the brush application interface, such as a different version of the image. The brush 618 can then be created for the virtual brush application based on the different version of the image and additional brush-edit inputs, and saved as the brush template 622.

The example system 600 includes a cloud-based image service 624, such as Adobe Creative Cloud™ that is accessible by client devices, to include the computing device 602, the mobile phone 102, and the tablet device 302. The image service 624 includes data storage 626 that may be implemented as any suitable memory, memory device, or electronic data storage for network-based data storage. The data storage maintains a brush library 628 of brush templates 630 that are accessible by an imaging application 632, such as when a user accesses the imaging application 632 (e.g., as a network-based application) from a client device (e.g., the computing device 602) to create a sketch 634 or other art work with the imaging application. The computing device 602 can communicate the brush template 622 of the brush 618 to the image service 624, where the brush template is then saved in the brush library 628 that is accessible by the virtual brush application 610 on the computing device. The cloud-based image service 624 may also include the virtual brush application as a network-based application 636 that is accessible from a client device.

The cloud-based image service 624 can also be implemented with server devices that are representative of one or multiple hardware server devices of the image service. Further, the cloud-based image service 624 can be implemented with various components, such as a processing system and memory, as well as with any number and combination of differing components as further described with reference to the example device shown in FIG. 12 to implement the services, applications, servers, and other features of camera-based brush creation. The imaging application 632 and/or the virtual brush application 636 can be implemented as software applications or modules, such as executable software instructions (e.g., computer-executable instructions) that are executable with a processor or processing system of the image service.

The example system 600 also includes a network 638, and any of the devices, servers, and/or services described herein can communicate via the network, such as for data communication between the computing device 602 and the cloud-based image service 624. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

Example method 700 is described with reference to FIG. 7 in accordance with one or more embodiments of camera-based brush creation. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
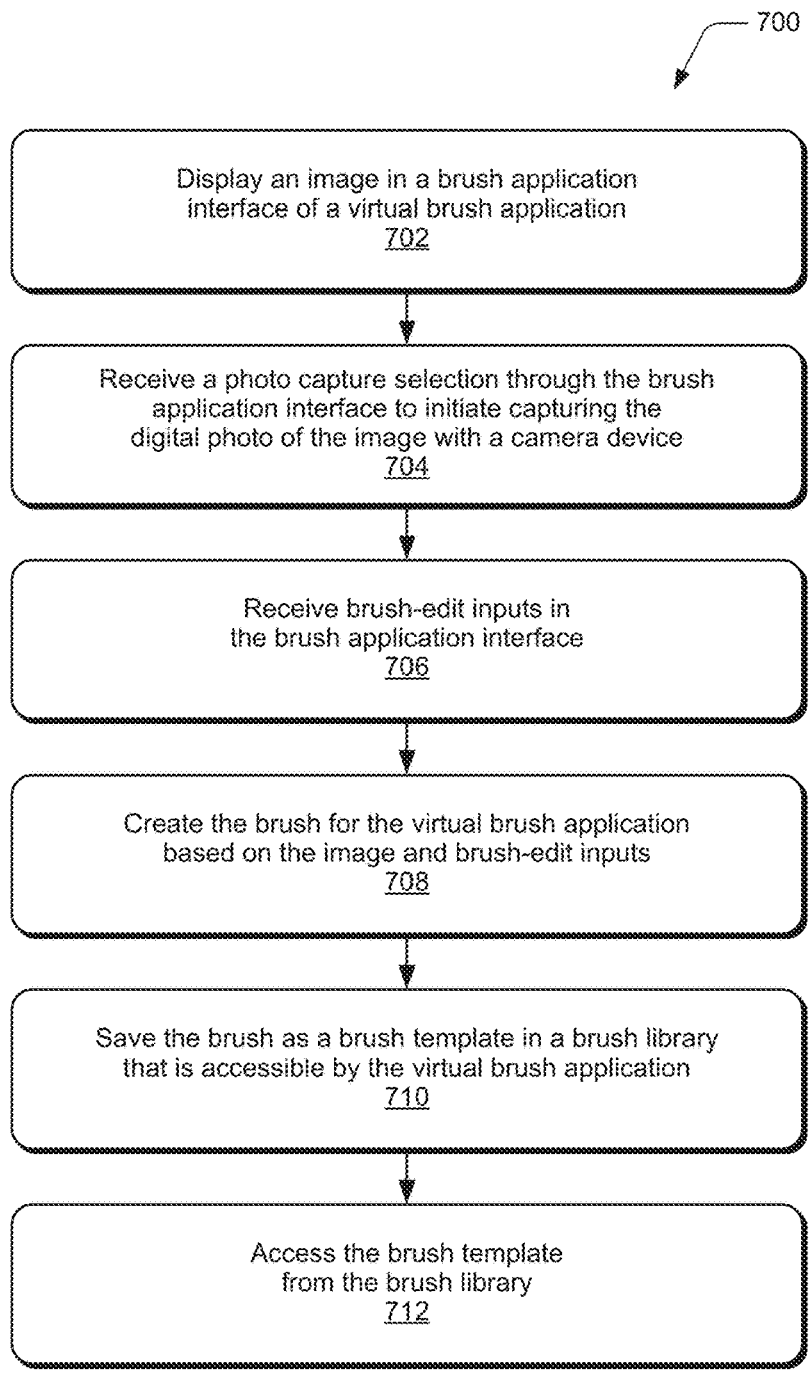
FIG. 7 illustrates example methods of camera-based brush creation in accordance with one or more embodiments of the techniques described herein.

FIG. 7 illustrates example method(s) 700 of camera-based brush creation, and is generally described with reference to the virtual brush application and the brush application interface implemented by the computing device as shown in the example system of FIG. 6. The order in which the method is described is not intended to be construed as a limitation, and any number or combination of the method operations can be combined in any order to implement a method, or an alternate method.

At 702, an image is displayed in a brush application interface of a virtual brush application. For example, the image 612 is displayed in the brush application interface 104 of the virtual brush application 610 on the computing device 602. At 704, a photo capture selection is received through the brush application interface to initiate capturing the digital photo of the image with a camera device. For example, a photo capture selection 110 can then be received through the brush application interface 104 to initiate capturing the digital photo 614 of the image 612 with the camera device 616 of the computing device. As shown in FIG. 1, the image 106 of the environment 108 (e.g., the sketch page of hand-drawn images) is displayed in the brush application interface 104, and the user positions the mobile phone 102 over the sketch page to capture the digital photo of the image 106 through the brush application interface 104 with the camera device of the mobile phone 102. Similarly as shown in FIG. 3, the image 304 of the environment 306 (e.g., a tree branch and leaves) is displayed in the brush application interface 104, and the user captures the digital photo of the image 304 through the brush application interface 104 with the camera device of the tablet device 302.

At 706, brush-edit inputs are received in the brush application interface and, at 708, the brush for the virtual brush application is created based on the image and brush-edit inputs. For example, the brush 618 is created for the virtual brush application 610 based on the image 612 and the brush-edit inputs 620. As shown in FIG. 2, the brush application interface 104 can include any number of different types of selectable brush-edit controls that a user can select as brush-edit inputs to modify an image and create a brush. The image 612 is altered based on the brush-edit inputs to refine and review the brush before saving the brush as the brush template 622. The brush 618 can be created as a scatter brush that repeats multiple images of the image 612 represented as a brush stroke in the brush application interface 104. Alternatively, the brush 114 can be created as a ribbon brush 118 that expands a middle section of the image represented as a brush stroke in the brush application interface 104. Further, the ribbon brush 118 includes selectable sections of the brush, such as a head section 120, a body section 122, and a tail section 124 of the image 106, and the body section 122 expands as a brush stroke with the head section and the tail section being maintained as ends of the brush stroke in the brush application interface.

In embodiments, the image 612 may be of a texture and the brush 618 is created based on the texture and the brush-edit inputs 620. Alternatively or in addition, the brush may be created by stretching the image to create a color palette based on color of the image 612, where the image is generally obfuscated by the stretching of the image. In addition, the creative process of camera-based brush creation can include canceling the image 612 as the basis from which the brush 618 is created, capturing another digital photo 614 with the camera device 616 through the brush application interface 104 as a different version of the image, creating the brush 618 based on the different version of the image and additional brush-edit inputs 620, and then saving the brush as the brush template 622.

At 710, the brush is saved as a brush template in a brush library that is accessible by the virtual brush application. For example, the brush 618 is saved as the brush template 622 at the computing device 602, and further, the brush template 622 of the brush 618 can be communicated to the cloud-based image service 624 where the brush template is saved in the brush library 628 that is accessible by the virtual brush application 610 on the computing device and/or is accessible by the imaging application 632 and the virtual brush application 636 at the image service 624.

At 712, the brush template is accessed from the brush library. For example, the brush templates 630 are accessible by the imaging application 632, such as when a user accesses the imaging application 632 (e.g., as a network-based application) from a client device (e.g., the computing device 602) to create the sketch 634 or other artwork with the imaging application. The brush template 622 stored as one of the brush templates 630 in the brush library 628 at the cloud-based image service 624 can also be accessed for updating the brush to create a revised brush template, and then the updated brush is saved as a revised brush template back in the brush library.

Figure 8:
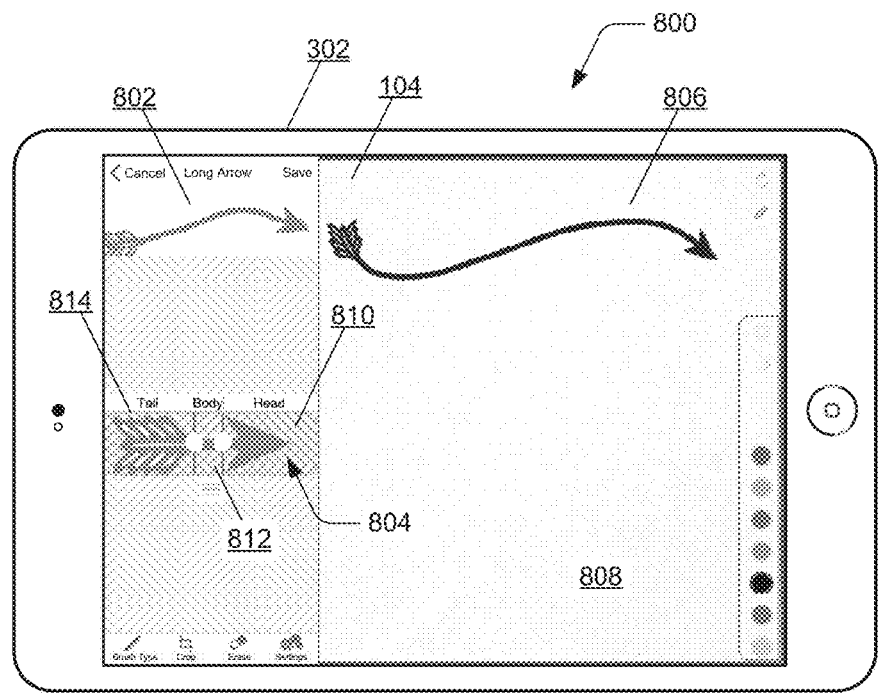
FIG. 8 illustrates an example of a ribbon brush created from an image in accordance with one or more embodiments of camera-based brush creation as described herein.

FIG. 8 illustrates an example 800 of a ribbon brush 802 shown displayed in the brush application interface 104 on the tablet device 302, where the ribbon brush is created from an image 804 rather than a vector source in embodiments of camera-based brush creation. The ribbon brush stretches the image 804 along a path as a brush stroke 806 is drawn on the canvas 808 in the brush application interface. The ribbon brush can be used to create a smooth, continuous brush stroke that looks like the source image 804. The ribbon brush 802 includes selectable sections of the brush, such as a head section 810, a body section 812, and a tail section 814 of the image 804, where the body section 812 expands as the brush stroke with the head section and the tail section being maintained as ends of the brush stroke in the brush application interface.

Figure 9:
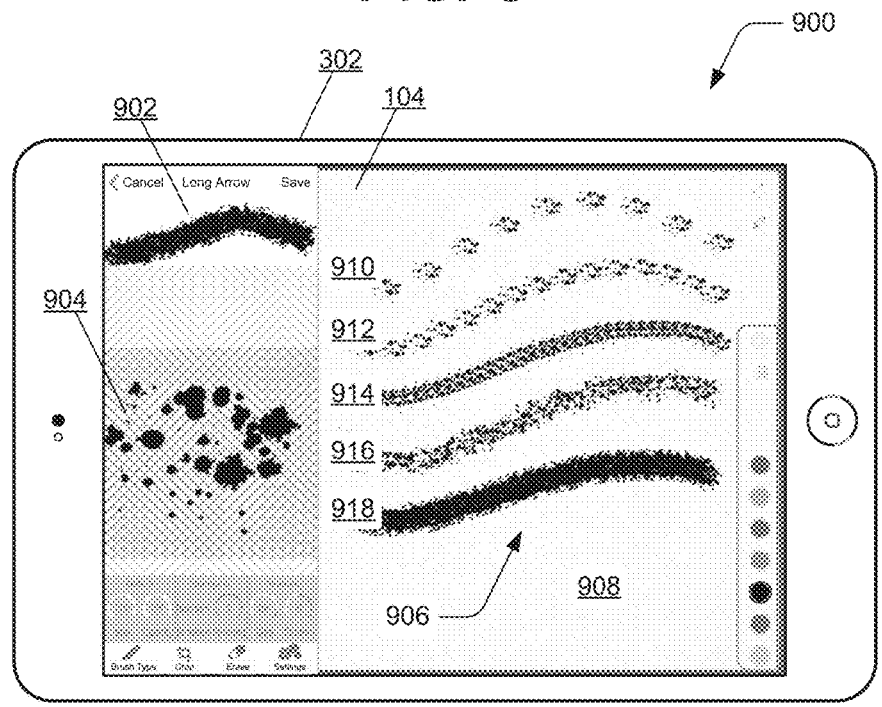
FIG. 9 illustrates an example of a scatter brush created from an image in accordance with one or more embodiments of camera-based brush creation as described herein.

FIG. 9 illustrates an example 900 of a scatter brush 902 shown displayed in the brush application interface 104 on the tablet device 302, where the scatter brush is created from an image 904. Generally, a scatter brush can be used like a "rubber stamp" of the source image, where brush strokes 906 appear as stamps of the image 904 multiple times along the path of a brush stroke drawn on the canvas 908 in the brush application interface. The size and rotation of the image 904, as well as the spacing between the "stamps" of the image, can be varied to achieve different effects, such as shown by the various brush strokes 906 shown in the brush application interface. For example, the top brush stroke 910 is created with a scatter brush that stamps the source image at a wide interval across the path. The next brush stroke 912 is created with a closer stamp spacing setting. The third brush stroke 914 illustrates a rotation of the source image altered to match the stroke path direction. The fourth brush stroke 916 applies a random rotation to each stamp of the source image. The bottom brush stroke 918 illustrates a very small stamp spacing in conjunction with random rotation of the source image.

Figure 10A:
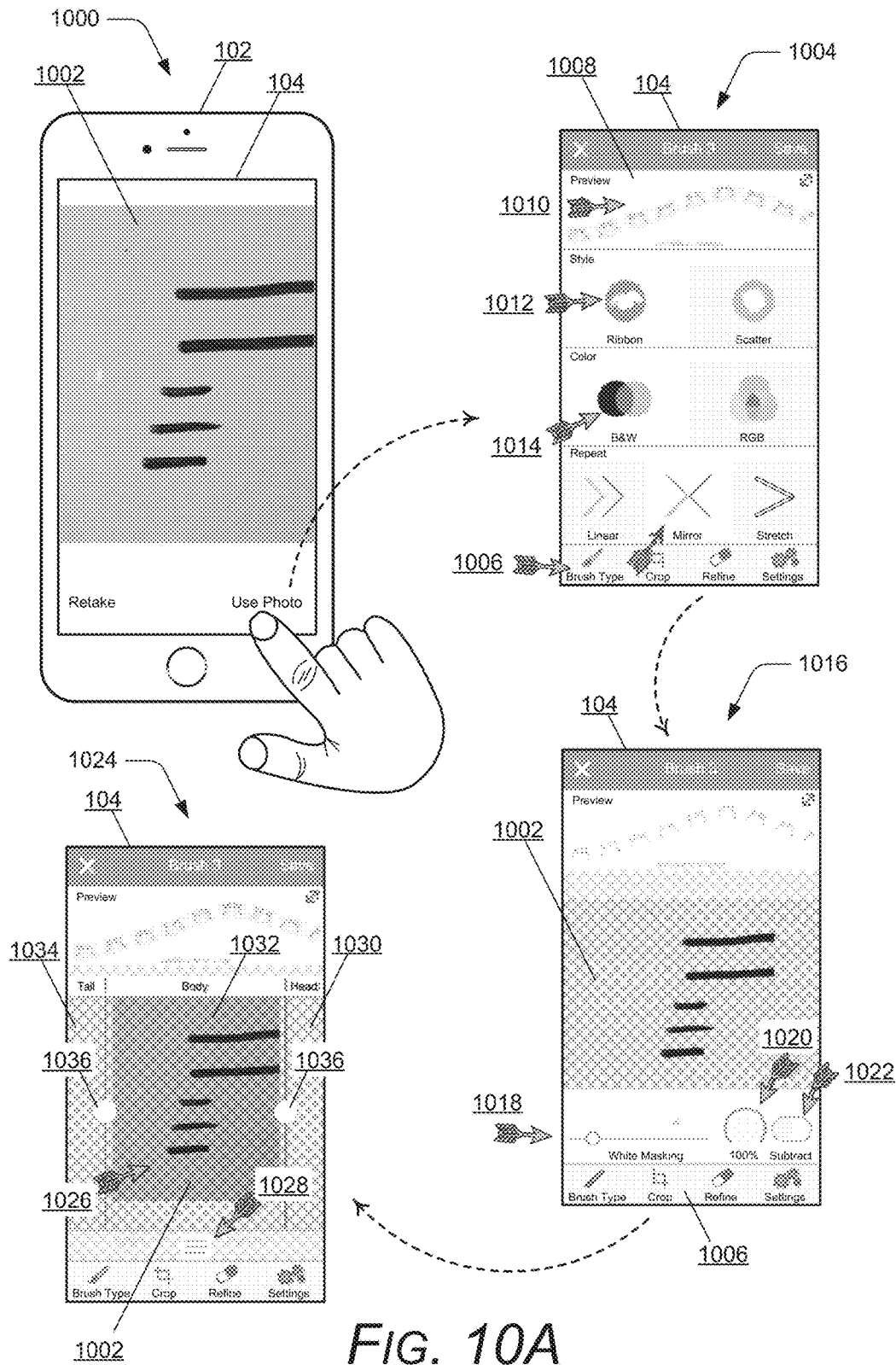
FIGS. 10A-C illustrate an example of camera-based brush creation of a ribbon brush in accordance with the techniques described herein.
Figure 10B:
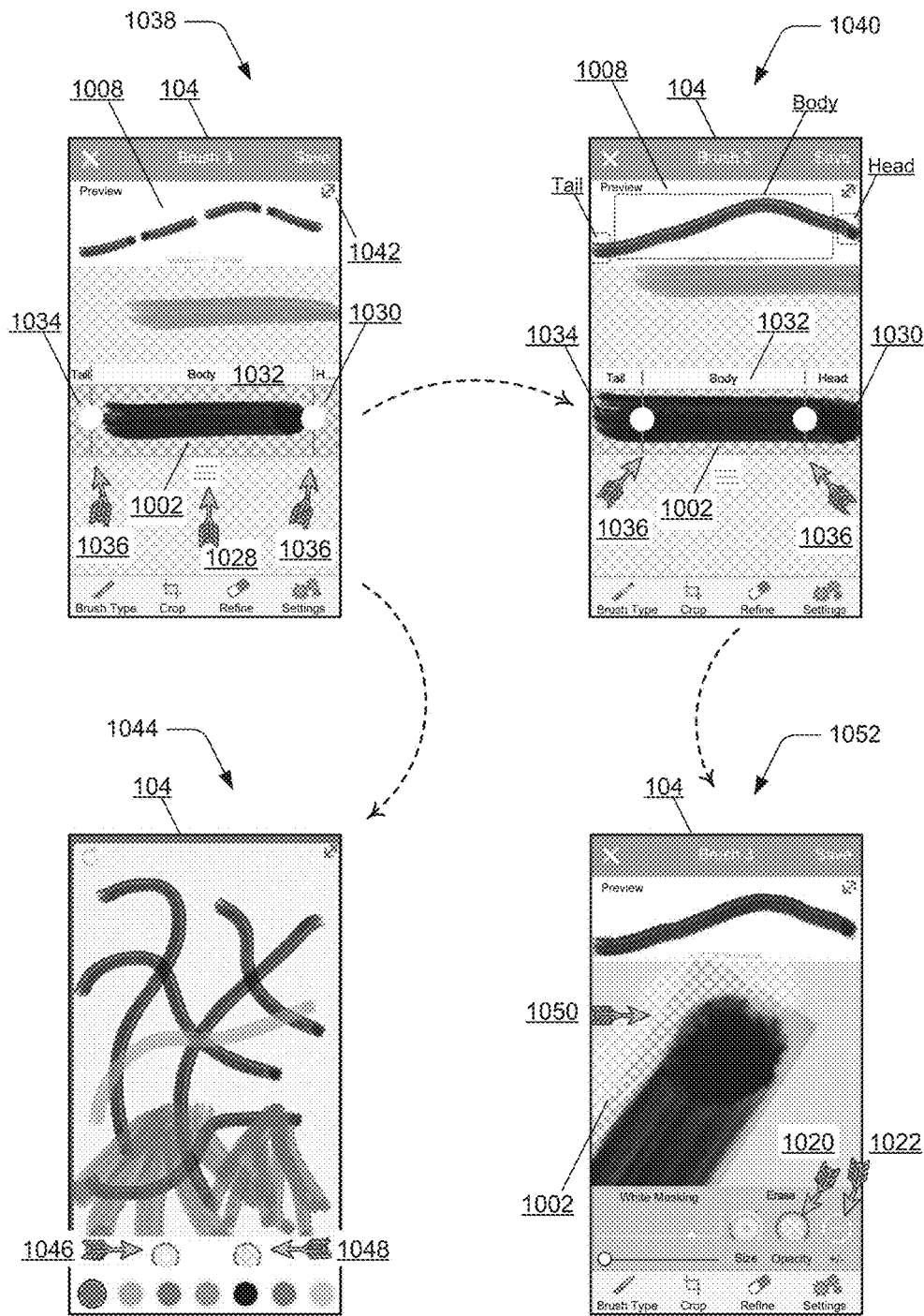
Figure 10C:
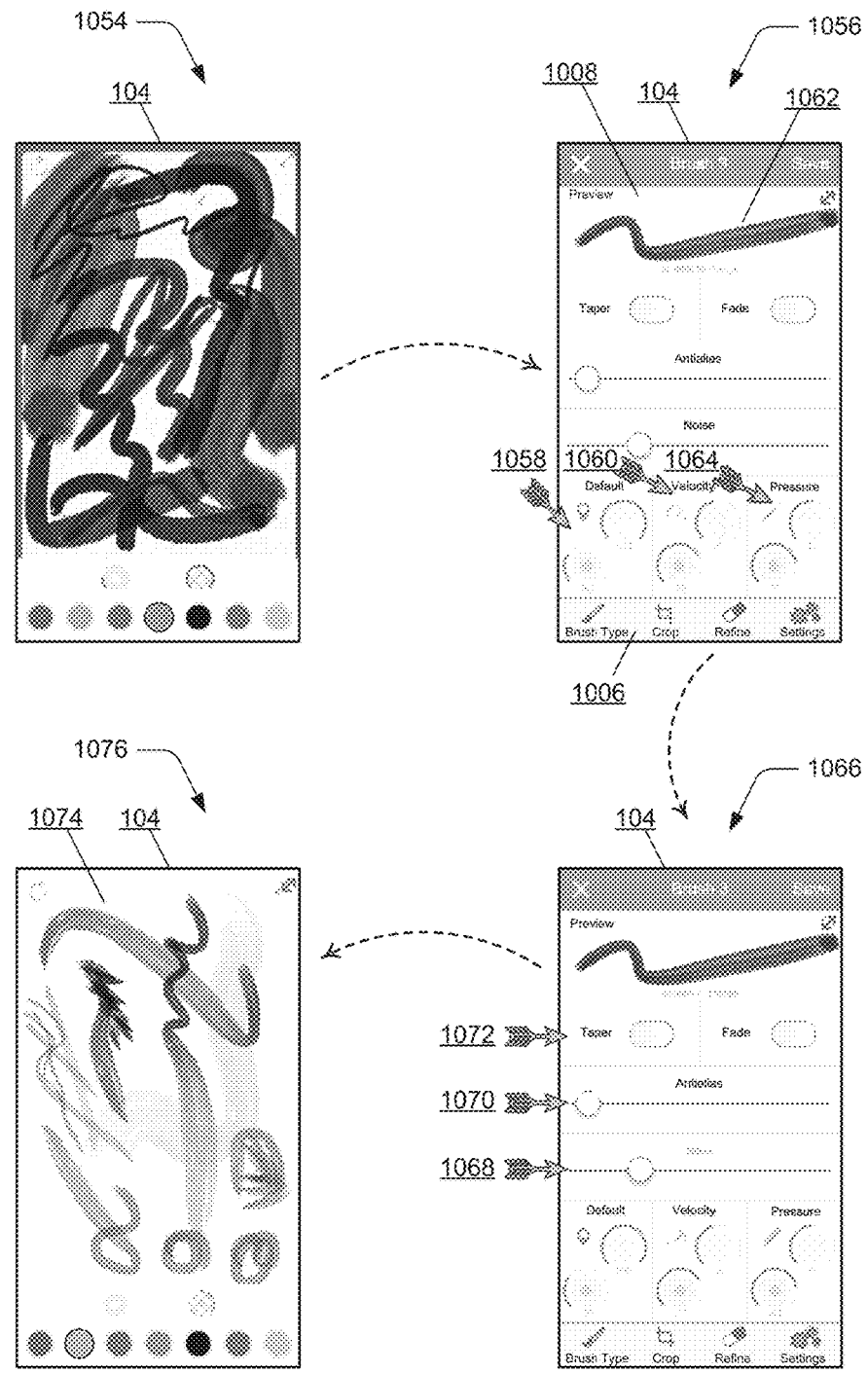

FIGS. 10A-10C illustrate an example 1000 of camera-based brush creation of a ribbon brush in accordance with the techniques described herein. In this example, an image 1002 of marks on a white board are captured through the brush application interface 104 on the mobile phone 102, and the brush application interface transitions to a brush editing mode 1004 of the virtual brush application 610. The tool bar 1006 of the brush application interface 104 includes the four basic categories of editing modes that can be selected to change the editing mode for brush-edit inputs to create a new brush from the image.

The preview section 1008 of the brush application interface displays an example brush stroke 1010 drawn with the current brush settings (e.g., the default settings in this case). A user can select the type of brush at 1012 as either a ribbon brush or a scatter brush, and the selection modifies the selectable brush-edit controls that are displayed in the brush application interface 104 when a particular editing mode for a ribbon brush or a scatter brush is selected. A user can change the color mode of the brush at 1014 to B&W (black and white) or RGB (i.e., color). In the B&W mode, white is completely transparent, black is completely opaque, and levels of gray are also levels of transparency. With a white background, such as with the image 1002, it is easy to mask out the desired image in the refine mode when editing a B&W brush.

A user can select the refine mode from the tool bar 1006, and the brush application interface 104 displays as shown at 1016, where the user can remove unwanted portions of the image 1002. Brushes generally look best when they have edge detail, and a user can touch and drag on the image in the brush application interface to erase parts of the image. A two-finger touch can be used to translate or rotate the image, and a two-finger pinch can be used to shrink or zoom the image. In implementations and as noted above, black is completely opaque, white is completely transparent, and any color in between is somewhat transparent. A user can adjust a white masking slider 1018 to change near white pixels into pure white pixels, which for this image 1002, can be used to quickly and easily remove the whiteboard background.

For an image that does not have a white background, or if the slider 1018 for white masking does not remove all of an image background, the portions of the image can simply be erased by the user drawing on the image with a finger or stylus. A user can also zoom in to the image for fine-tuned edits around the edges, such as along the edges of the marker lines in this image 1002. The brush application interface 104 includes a selectable opacity control 1020 to change the opacity of the eraser, which can be useful to achieve feathered edges or simply making portions of the image a little more transparent. If more of the image 1002 is erased than intended, a user can toggle a subtract control 1022 to draw the missing content back into the image.

A user can select the crop mode from the tool bar 1006, and the brush application interface 104 displays as shown at 1024, where the user can define the section of the image 1002 to use as the brush sample. The brush application interface 104 includes an image manipulation region 1026 in which a user can translate the image with a one-finger drag, two-finger pinch resizing, and two-finger rotation of the image. A selectable height control 1028 in the brush application interface 104 allows the user to change the height of the image manipulation region 1026.

In this example the user can change the width of the crop region indirectly by zooming the image in or out with a two-finger pinch gesture. As shown and described with reference to FIGS. 1 and 4, the image manipulation region 1026 for the ribbon brush includes selectable sections of the brush, such as a head section 1030, a body section 1032, and a tail section 1034 of the image 1002. The body section 1032 expands as a brush stroke while the head and tail sections are maintained as ends of the brush stroke in the brush application interface. The brush-edit inputs include the selectable sliders 1036 to set the head section 1030, the body section 1032, and the tail section 1034 of the image 1002 in the brush application interface 104.

FIG. 10B further illustrates the example of the crop mode in the brush application interface 104 as shown at 1038. In this example, the selectable sliders 1036 for the head section 1030 and the tail section 1034 of the image 1002 are moved out to the edges of the image to illustrate how the body section 1032 is repeated along the brush stroke path, as shown in the preview section 1008 of the brush application interface 104. For a brush that represents the source image 1002, the selectable sliders 1036 for the head section 1030 and the tail section 1034 of the image 1002 are moved in, as shown at 1040.

The preview section 1008 of the brush application interface 104 illustrates the brush stroke path with the adjustment. Indications of the head, body, and tail sections that correlate to the brush stroke in the preview section 1008 are also shown in this example, where the body section 1032 expands as the brush stroke, and the head and tail sections are each maintained as the ends of the brush stroke. In implementations, the virtual brush application 610 renders the head section 1030 of the brush stroke first, then the tail section 1034, and then if the brush stroke is longer than the combination of the head section and the tail section (e.g., head+tail), the body section 1032 is repeated between the two. The body section 1032 can be repeated with mirroring (e.g., as in this example brush stroke), or linearly repeated end-to-end, or stretched along the rest of the available stroke length. The brush stroke represents the image of the marker masked to have a look and "feel" of a real whiteboard marker. The brush application interface 104 also includes a selectable expand control 1042 that a user can select to initiate a larger canvas on which to test draw the brush strokes with the brush that is being created.

In the expanded canvas mode as shown at 1044, a user may also adjust the size of the brush strokes with a selectable size control 1046 and/or adjust the opacity of the brush strokes with a selectable opacity control 1048 displayed in the brush application interface 104. While B&W (black and white) brushes can be easier to mask out the background, they can result in brushes that have transparency. To create a more opaque brush, the brush can be changed to color (e.g., in the brush type of the tool bar 1006), and then the user can manually erase the background with the refine tool because white will no longer be transparent.

A user can select the refine tool from the tool bar 1006 to erase portions of the image 1002 in the image region 1050 of the brush application interface 104, as shown at 1052. A user can move the image 1002 in the image region 1050 using a two-finger drag touch input, scale the image using a two-finger pinch touch input, and rotate the image with a two-finger rotate input. In implementations, the eraser tip size scales with the zoom factor so that it is approximately the size of a fingertip, regardless of the zoom level. The selectable opacity control 1020 can be used to change the opacity of the eraser, such as from pure transparent to something less, and to make portions of the image somewhat transparent, or to achieve a feathered edge. If more of the image 1002 is erased than intended, a user can toggle the subtract control 1022 to draw the missing content back into the image.

FIG. 10C further illustrates example brush strokes 1054 drawn in the brush application interface 104 based on the erase edits to erase the background around the stroke as shown at 1052 and described with reference to FIG. 10B. The brush strokes are much more opaque, almost oil like, as compared to the brush strokes shown at 1044 in FIG. 10B. Note that applying color to a color brush is implemented differently than for a B&W brush. Pure black and pure white image portions will not be affected by the selected color. However, every shade in between will take on some color, and pure gray will completely take on the selected color. This is similar to using an overlay blend mode to blend a solid color with the brush image.

The brush can be further edited by selecting the brush type and settings controls in the tool bar 1006, such as to reselect B&W, and then add variable width and opacity to the brush stroke, as shown at 1056. In this example, the brush application interface 104 includes selectable dial settings that a user can adjust for brush-edit inputs, such as the default selectable dials 1058 to change the default brush size and opacity. The user can adjust the velocity selectable dials 1060 to decrease the default size of the brush stroke and/or the opacity. Brush-edit input values larger than zero will make the brush edge larger as the user input moves quicker, or the brush less transparent if the opacity is changed. Brush-edit input values that are smaller than zero will display as the reverse. In this case, the brush stroke is set to get bigger with the speed of the brush-edit input, and the test brush stroke 1062 shown displayed in the preview section 1008 of the brush application interface illustrates this effect. The pressure selectable dials 1064 are implemented to allow the user to apply the same types of change in response to stylus pressure.

Further, as shown at 1066, a selectable slide control 1068 can be used to adjust the level of noise applied to a brush stroke, and a selectable slide control 1070 can be used to adjust the amount of smoothing (e.g., antialiasing) applied to the brush stroke. A value of zero will result in edges that are very crisp and stark, whereas a value of one-hundred will result in blurry edges. The selectable toggle controls 1072 allow a user to control tapering and fading effects applied to the ends of each brush stroke. The test brush strokes 1074 now appear more dynamic as shown at 1076 in the expanded canvas mode of the brush application interface 104, and the natural looking texture of the marker comes through in the newly created brush.

Figure 11A:
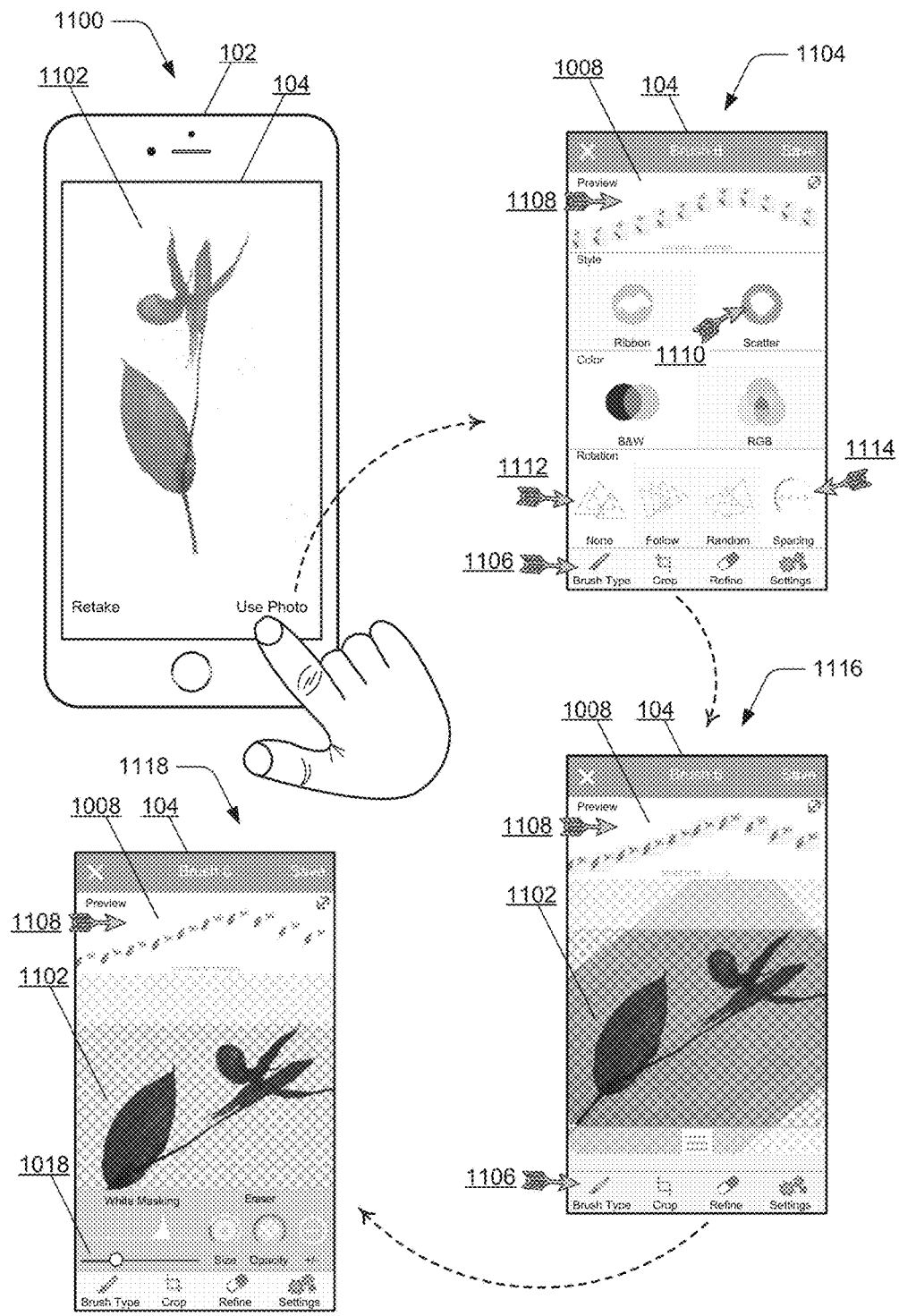
FIGS. 11A-C illustrate an example of camera-based brush creation of a scatter brush in accordance with the techniques described herein.
Figure 11B:
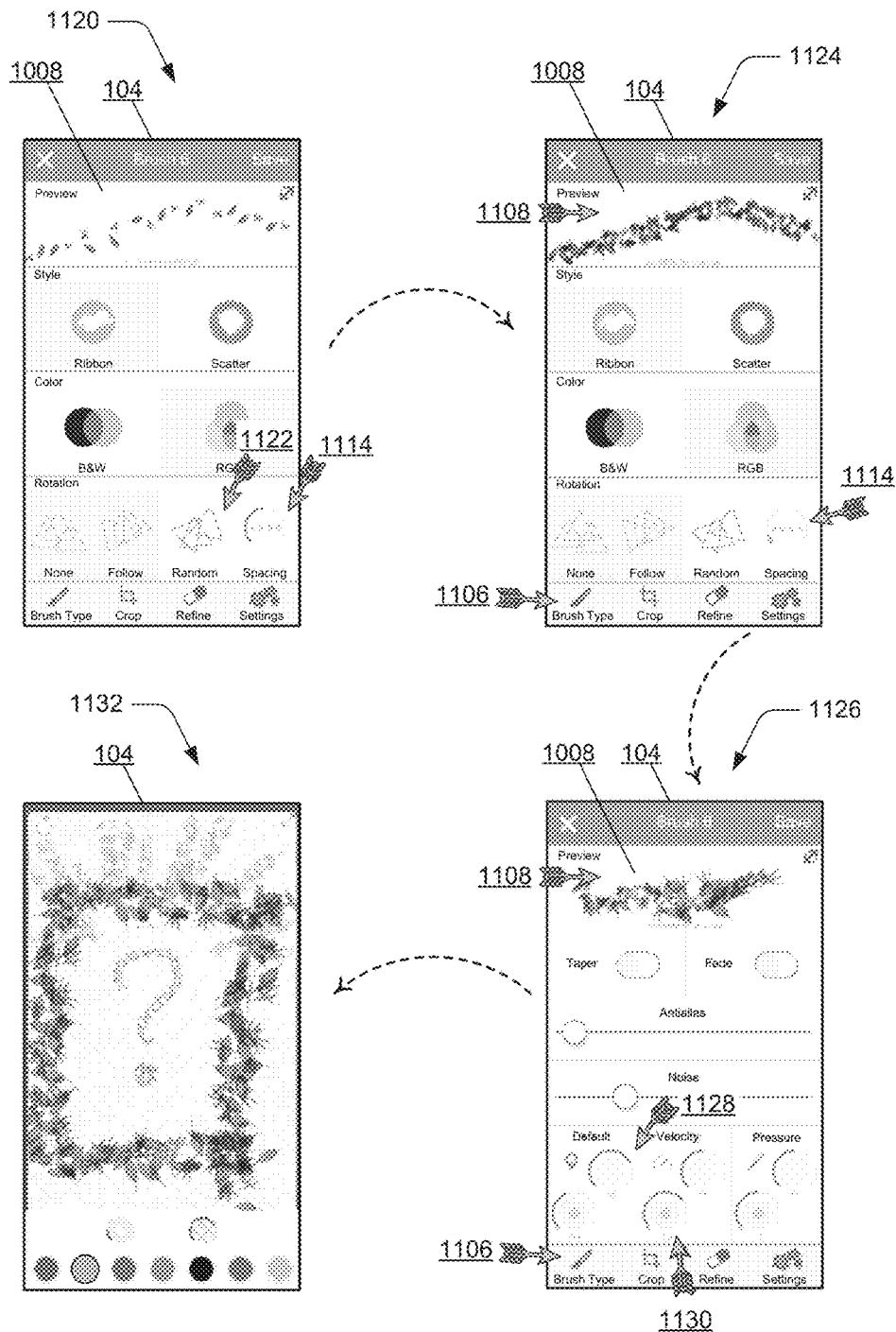
Figure 11C:
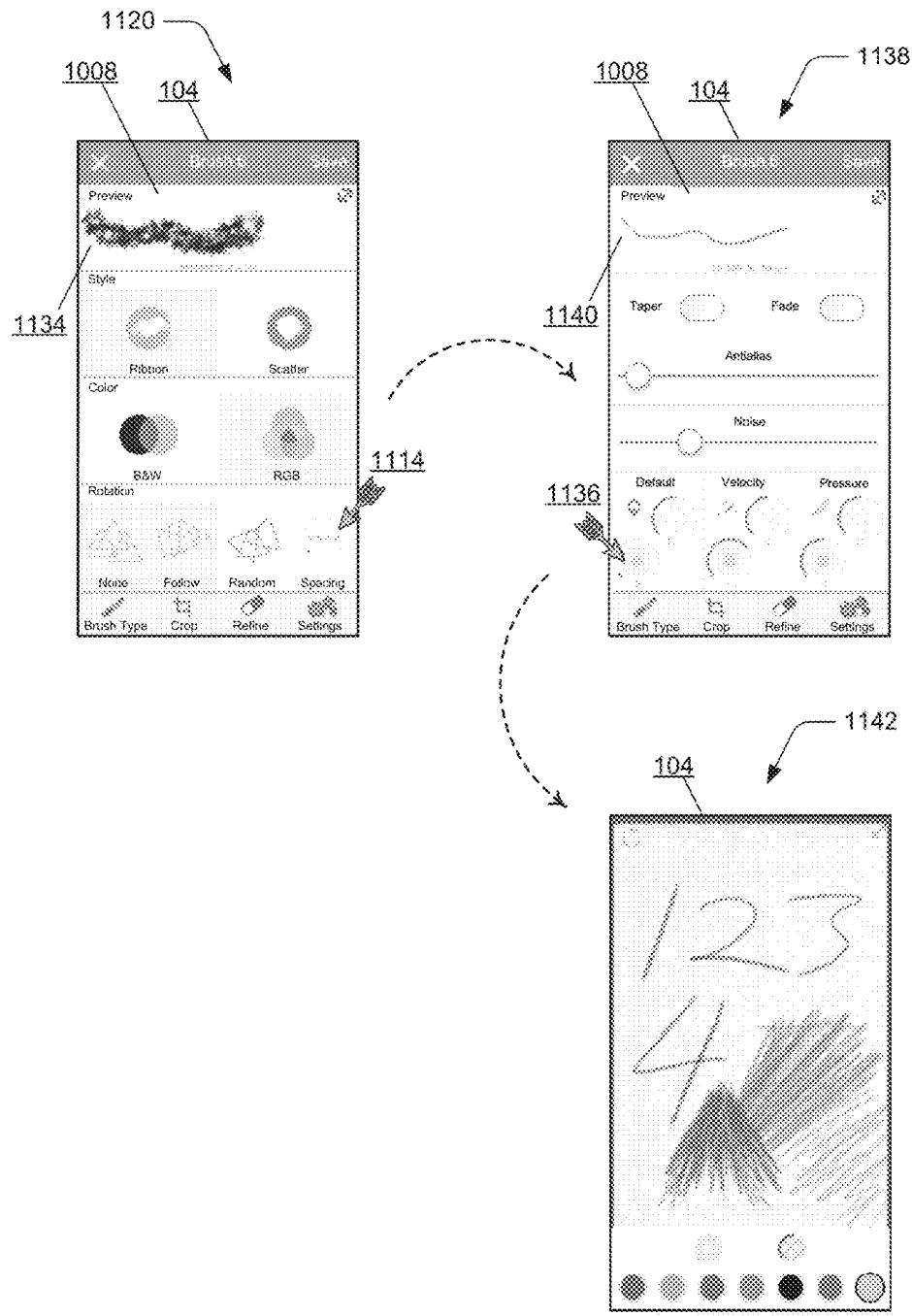

FIGS. 11A-11C illustrate an example 1100 of camera-based brush creation of a scatter brush in accordance with the techniques described herein. In this example, an image 1102 of a leafy stem with a white background is captured through the brush application interface 104 on the mobile phone 102, and the brush application interface transitions to a brush editing mode 1104 of the virtual brush application 610. The tool bar 1106 of the brush application interface 104 includes the four basic categories of editing modes that can be selected to change the editing mode for brush-edit inputs to create a new brush from the image. The preview section 1008 of the brush application interface 104 displays an example brush stroke 1108 that is different from the ribbon brush shown and described with reference to FIGS. 10A-C. Rather than stretching and repeating the body section of the image along a continuous ribbon like path, the scatter brush "stamps" a sample of the source image 1102 repeatedly along the path of the brush stroke. The selectable scatter control 1110 can be selected by a user to create a scatter brush from the image. The selectable rotation setting 1112 can be used to adjust how each stamp of the image 1102 is oriented, and a selectable spacing selector 1114 can be used to adjust how closely spaced each stamp of the image is placed.

An example of the crop tool is further shown at 1116, for the scatter brush created from the image 1102. Note that the crop view of the image does not include the head, body, and tail sections in the brush application interface 104, such as when creating a ribbon brush. The brush stroke 1108 of the cropped scatter brush is displayed in the preview section 1008 of the brush application interface 104. A user can transition to remove the background of the image 1102 by selecting the refine tool from the tool bar 1106, as shown at 1118. The white masking slider 1018 allows the user to remove the background white canvas from the image 1102, and the "stamps" of the scatter brush displayed in the preview section 1008 of the brush application interface 104 has clearly defined edges.

FIG. 11B further illustrates the brush type selection from the tool bar 1106 that a user can select to display selectable brush-edit controls in the brush application interface 104, as shown at 1120, to further create the scatter brush from the image 1102. A user can set the rotation of each brush to be random with the random selector 1122, such as to scatter the leaves of the image like decoration, and as mentioned above, adjust the spacing of the stamps that form a brush stroke with the selectable spacing selector 1114 to bunch the leaves of the image closer together, as shown in the preview section 1008 of the brush application interface 104. An example of a spacing adjustment is shown at 1124 to illustrate using the selectable spacing selector 1114 to bunch the leaves of the image 1102 close together, such as shown by the example brush stroke 1108 in the preview section 1008 of the brush application interface 104.

A user can initiate the settings from the tool bar 1106 to apply stroke dynamics as brush-edit inputs, as shown at 1126. The default opacity of the brush is increased with an opacity control 1128, and a velocity control 1130 can be adjusted to increase the stamp size as a user input with a finger or stylus moves faster. The changes are shown at 1132 in the expanded test canvas of the brush application interface 104.

FIG. 11C illustrates that a user can create a smooth and continuous brush stroke 1134 from the scatter brush having the selectable stamp spacing selector 1114 set near zero so that the overlapping stamps create a continuous, smooth shape as shown in the preview section 1008 of the brush application interface 104. A user can adjust the brush-edit inputs to create a brush that is something more like a crayon or fat pencil. A crayon stroke has a somewhat random edge to it, and the user can adjust the default brush size 1136 down utilizing the settings in the tool bar 1106 as shown at 1138. The test brush stroke 1140 shown in the preview section 1008 of the brush application interface 104 illustrates how the brush stroke is now more crayon or pencil-like. The changes are shown at 1142 in the expanded test canvas of the brush application interface 104. Note that for this type of scatter brush, the source image 1102 has little relationship to how the brush stroke will look. Additionally, offsetting the image in the crop mode can add some additional random translation when random rotation is applied.

Figure 12:
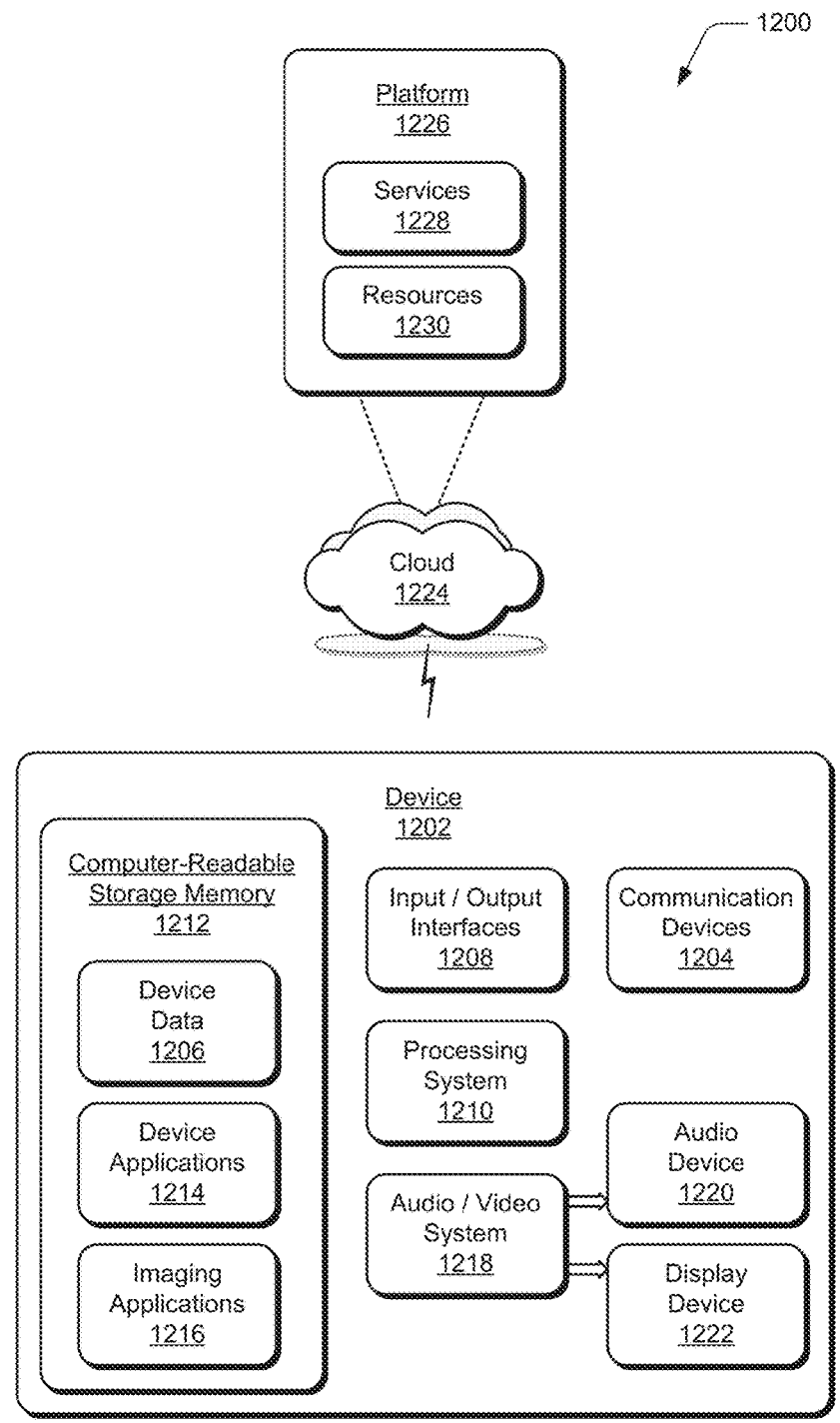
FIG. 12 illustrates an example system with an example device that can implement embodiments of camera-based brush creation.

FIG. 12 illustrates an example system 1200 that includes an example device 1202, which can implement embodiments of camera-based brush creation. The example device 1202 can be implemented as any of the computing devices and/or services (e.g., server devices) described with reference to the previous FIGS. 1-11, such as any type of computing device, client device, mobile phone, tablet, communication, entertainment, gaming, media playback, and/or other type of device. For example, the mobile phone 102, the tablet device 302, the computing device 602, and/or server devices of the cloud-based image service 624 may be implemented as the example device 1202.

The device 1202 includes communication devices 1204 that enable wired and/or wireless communication of device data 1206, such as brush templates and imaging applications content that is transferred from one computing device to another, and/or synched between multiple computing devices. The device data can include any type of audio, video, and/or image data that is generated by applications executing on the device. The communication devices 1204 can also include transceivers for cellular phone communication and/or for network data communication.

The device 1202 also includes input/output (I/O) interfaces 1208, such as data network interfaces that provide connection and/or communication links between the device, data networks, and other devices. The I/O interfaces can be used to couple the device to any type of components, peripherals, and/or accessory devices, such as a digital camera device that may be integrated with device 1202. The I/O interfaces also include data input ports via which any type of data, media content, and/or inputs can be received, such as user inputs to the device, as well as any type of audio, video, and/or image data received from any content and/or data source.

The device 1202 includes a processing system 1210 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1202 may further include any type of a system bus or other data and command transfer system that couples the various components within the device. A system bus can include any one or combination of different bus structures and architectures, as well as control and data lines.

The device 1202 also includes computer-readable storage memory 1212, such as data storage devices that can be accessed by a computing device, and that provide persistent storage of data and executable instructions (e.g., software applications, modules, programs, functions, and the like). Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 1212 provides storage of the device data 1206 and various device applications 1214, such as an operating system that is maintained as a software application with the computer-readable storage memory and executed by the processing system 1210. In this example, the device applications also include imaging applications 1216 that implement embodiments of camera-based brush creation, such as when the example device 1202 is implemented as the computing device 602 shown in FIG. 1. Examples of the imaging application 1216 includes the virtual brush application 610 that is implemented by the computing device 602 and the imaging application 632 that is implemented by the cloud-based image service 624, as described with reference to FIG. 6.

The device 1202 also includes an audio and/or video system 1218 that generates audio data for an audio device 1220 and/or generates display data for a display device 1222. The audio device and/or the display device include any devices that process, display, and/or otherwise render audio, video, display, and/or image data, such as the image content of a digital photo. In implementations, the audio device and/or the display device are integrated components of the example device 1202. Alternatively, the audio device and/or the display device are external, peripheral components to the example device. In embodiments, at least part of the techniques described for camera-based brush creation may be implemented in a distributed system, such as over a "cloud" 1224 in a platform 1226. The cloud 1224 includes and/or is representative of the platform 1226 for services 1228 and/or resources 1230. For example, the services 1228 may include the cloud-based image service described with reference to FIG. 6.

The platform 1226 abstracts underlying functionality of hardware, such as server devices (e.g., included in the services 1228) and/or software resources (e.g., included as the resources 1230), and connects the example device 1202 with other devices, servers, etc. The resources 1230 may also include applications and/or data that can be utilized while computer processing is executed on servers that are remote from the example device 1202. Additionally, the services 1228 and/or the resources 1230 may facilitate subscriber network services, such as over the Internet, a cellular network, or Wi-Fi network. The platform 1226 may also serve to abstract and scale resources to service a demand for the resources 1230 that are implemented via the platform, such as in an interconnected device embodiment with functionality distributed throughout the system 1200. For example, the functionality may be implemented in part at the example device 1202 as well as via the platform 1226 that abstracts the functionality of the cloud 1224.

Although embodiments of camera-based brush creation have been described in language specific to features and/or methods, the appended claims are not necessarily limited to the specific features or methods described. Rather, the specific features and methods are disclosed as example implementations of camera-based brush creation, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method to create a brush for a virtual brush application based on an image captured as a digital photo, the method comprising:
   displaying the image in a brush application interface of the virtual brush application;
   receiving a photo capture selection through the brush application interface to initiate capturing the digital photo of the image with a camera device;
   generating a brush preview based on the image and brush-edit inputs, the brush preview including a user-manipulated test brush stroke displayed in a test canvas of the brush application interface, and the brush preview changing with the brush-edit inputs;
   creating the brush for the virtual brush application based on the brush preview; and
   saving the brush as a brush template in a brush library that is accessible by the virtual brush application.

2. The method as recited in claim 1, wherein the image is of a texture and said creating the brush is based on the texture and the brush-edit inputs.

3. The method as recited in claim 1, wherein said creating the brush comprises stretching the image to create a color palette based on colors in the image, and wherein the image is obfuscated by the stretching.

4. The method as recited in claim 1, wherein before said saving the brush created from the image as the brush template, the method further comprising:
   canceling the image as the basis from which the brush is created;
   receiving another photo capture selection in the brush application interface to initiate capturing another digital photo as a different version of the image with the camera device;
   creating the brush for the virtual brush application based on the different version of the image and additional brush-edit inputs; and
   said saving the brush as the brush template in the brush library that is accessible by the virtual brush application.

5. The method as recited in claim 1, wherein said creating the brush for the virtual brush application comprises creating the brush as a ribbon brush that includes a user-selectable head, tail, and body region.

6. The method as recited in claim 1, wherein said creating the brush for the virtual brush application comprises altering the image based on the brush-edit inputs to refine and review the brush before said saving the brush as the brush template.

7. The method as recited in claim 1, further comprising:
   accessing the brush template from the brush library;
   updating the brush to create a revised brush template; and
   saving the updated brush as the revised brush template in the brush library.

8. The method as recited in claim 1, further comprising displaying the brush in a preview window of the brush application interface, the preview window showing how the brush would appear with the current brush-edit inputs.

9. The method as recited in claim 1, further comprising applying the brush-edit inputs to the image to create the brush after zooming to a desired zoom level of the image.

10. A computing device implemented to create a brush for a virtual brush application based on an image captured as a digital photo, the computing device comprising:
    a display device configured to display the image in a brush application interface of the virtual brush application;
    a camera device configured to capture the digital photo of the image responsive to a photo capture selection initiated through the brush application interface;
    a memory and processor system configured to execute the virtual brush application that is implemented to:
    generate a brush preview based on the image and brush-edit inputs, the brush preview including a user-manipulated test brush stroke displayed in a test canvas of the brush application interface, and the brush preview changing with the brush-edit inputs;
    create the brush based on the image and brush-edit inputs according to the brush preview; and
    save the brush as a brush template in a brush library that is accessible by the virtual brush application.

11. The computing device as recited in claim 10, wherein the image is of a texture and the virtual brush application is implemented to said create the brush based on the texture and the brush-edit inputs.

12. The computing device as recited in claim 10, wherein the virtual brush application is implemented to said create the brush by the image stretched to create a color palette based on colors in the image, and wherein the image is obfuscated when stretched.

13. The computing device as recited in claim 10, wherein:
    the virtual brush application is implemented to cancel the image as the basis from which the brush is created responsive to an image cancel selection;
    the camera device is configured to capture another digital photo as a different version of the image responsive to another photo capture selection initiated in the brush application interface;
    the virtual brush application is implemented to:
    create the brush based on the different version of the image and additional brush-edit inputs; and
    said save the brush as the brush template in the brush library that is accessible by the virtual brush application.

14. The computing device as recited in claim 10, wherein the virtual brush application is implemented to said create the brush as a ribbon brush that stretches a middle section of the image represented as a brush stroke in the brush application interface.

15. The computing device as recited in claim 10, wherein the virtual brush application is implemented to said create the brush as a ribbon brush that includes user-selectable sections of the brush, the selectable sections comprising a head section, a body section, and a tail section of the image.

16. The computing device as recited in claim 10, wherein the virtual brush application is implemented to alter the image based on the brush-edit inputs to refine and review the brush before the brush is saved as the brush template.

17. The computing device as recited in claim 10, wherein the virtual brush application is implemented to:
    access the brush template from the brush library;

update the brush to create a revised brush template based on additional brush-edit inputs; and save the updated brush as the revised brush template in the brush library.

18. The computing device as recited in claim 10, wherein the virtual brush application is implemented to said create the brush as the ribbon brush that linearly repeats the body section of the brush.

19. A method, comprising:

receiving a brush template of a brush from a client device, the brush created based on an image captured as a digital photo in a brush application interface displayed at the client device;

editing the brush with brush-edit inputs via brush-edit controls applied to a brush preview generated based on the image and the brush-edit inputs, the brush preview including a user-manipulated test brush stroke displayed in a test canvas interface and the brush preview changing with the brush-edit inputs;

saving the brush template of the edited brush in a brush library; and receiving a request from the client device to interface with an imaging application that accesses the brush template of the edited brush stored in the brush library to create a sketch.

20. The method as recited in claim 19, wherein the brush is created as a scatter brush that repeats multiple ones of the brush images represented as a brush stroke in the imaging application interface.

* * * * *